United States Patent
Fukae

(10) Patent No.: US 10,749,217 B2
(45) Date of Patent: Aug. 18, 2020

(54) POWER SOURCE DEVICE

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventor: Kazushi Fukae, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 75 days.

(21) Appl. No.: 16/094,807

(22) PCT Filed: Mar. 28, 2017

(86) PCT No.: PCT/JP2017/012660
§ 371 (c)(1),
(2) Date: Oct. 18, 2018

(87) PCT Pub. No.: WO2017/187867
PCT Pub. Date: Nov. 2, 2017

(65) Prior Publication Data
US 2019/0097277 A1    Mar. 28, 2019

(30) Foreign Application Priority Data

Apr. 27, 2016   (JP) ................................ 2016-088870

(51) Int. Cl.
*H02J 7/02* (2016.01)
*H01M 10/44* (2006.01)
(Continued)

(52) U.S. Cl.
CPC ............... *H01M 10/44* (2013.01); *H02J 7/02* (2013.01); *H02J 7/342* (2020.01); *H02J 7/345* (2013.01);
(Continued)

(58) Field of Classification Search
CPC .. H02J 7/02; H02J 7/342; H02J 7/345; H01M 10/44; H02M 3/158; H02M 2001/0045
(Continued)

(56) References Cited

U.S. PATENT DOCUMENTS 6,052,022 A * 4/2000 Lee ....................... H02M 3/073
                                                              327/589
6,075,343 A * 6/2000 Hsu ....................... H02J 7/0031
                                                              320/134

(Continued)

FOREIGN PATENT DOCUMENTS

JP    2001-296928 A    10/2001
JP    2008-301638 A    12/2008
(Continued)

OTHER PUBLICATIONS

May 9, 2017 Search report issued in International Patent Application No. PCT/JP2017/012660.

*Primary Examiner* — Phallaka Kik
(74) *Attorney, Agent, or Firm* — Oliff PLC

(57) ABSTRACT

A power source device, capable of charging a power storage device using power from a power source, is realized with a configuration capable of suppressing the generation of heat and noise. The power source includes a controller that determines an output state of a power storage device on the basis of a detection value detected by a voltage detection circuit. When the output state of the power storage device corresponds to a prescribed high-voltage state when prescribed charging conditions are satisfied, the controller
(Continued)

causes only a first charging circuit, among the first charging circuit and a second charging circuit, to operate. When the output state corresponds to a prescribed low-voltage state, the controller causes only the second charging circuit to operate.

6 Claims, 4 Drawing Sheets

(51) Int. Cl.
    *H02M 3/158*    (2006.01)
    *H02M 7/02*    (2006.01)
    *H02J 7/34*    (2006.01)
    *H02M 1/00*    (2006.01)

(52) U.S. Cl.
    CPC .... *H02M 3/158* (2013.01); *H02M 2001/0045* (2013.01)

(58) Field of Classification Search
    USPC ............... 320/107, 125, 138, 162, 153, 164
    See application file for complete search history.

(56) References Cited

U.S. PATENT DOCUMENTS

| | | | |
|---|---|---|---|
| 9,331,569 B1* | 5/2016 | Chiu | H02M 3/07 |
| 2001/0028571 A1 | 10/2001 | Hanada et al. | |
| 2008/0297118 A1 | 12/2008 | Honma et al. | |
| 2012/0008343 A1* | 1/2012 | Chen | H02M 1/36 363/21.09 |
| 2012/0161738 A1 | 6/2012 | Nakashima | |
| 2014/0035514 A1* | 2/2014 | Wang | H04W 52/0261 320/107 |
| 2014/0253077 A1* | 9/2014 | Clavette | H02M 3/156 323/282 |
| 2015/0251545 A1* | 9/2015 | Matsukura | H02J 5/005 320/108 |
| 2015/0291052 A1* | 10/2015 | Nakazawa | B60L 8/003 320/101 |
| 2016/0197506 A1* | 7/2016 | Abiru | H02J 7/0047 320/134 |
| 2016/0301225 A1* | 10/2016 | Shiraishi | H02J 7/007 |
| 2017/0126052 A1* | 5/2017 | Toki | H02J 7/045 |
| 2017/0279275 A1* | 9/2017 | Yamamoto | H02J 7/0024 |

FOREIGN PATENT DOCUMENTS

| | | | |
|---|---|---|---|
| JP | 2009148006 A | * | 7/2009 |
| JP | 4862074 B2 | | 1/2012 |
| JP | 2012-139023 A | | 7/2012 |
| JP | 2013-179801 A | | 9/2013 |
| JP | 2014003737 A | * | 1/2014 |
| JP | 2014027850 A | * | 2/2014 |
| JP | 5618024 B2 | | 11/2014 |
| JP | 2016-025774 A | | 2/2016 |

* cited by examiner

POWER SOURCE DEVICE

TECHNICAL FIELD

The present disclosure relates to a power source device.

BACKGROUND ART

Techniques such as those of Patent Documents 1 and 2 have been proposed as techniques for charging a power storage unit using power from a power source unit. Patent Document 1 discloses a configuration in which a battery and an electric double layer capacitor are connected by a path-interrupting switching element and a current limiting resistor, with the electric double layer capacitor being charged while current is limited by the current limiting resistor. Patent Document 2 discloses a configuration in which a battery and an electric double layer capacitor are connected by a step-down DC-DC converter, and this technique provides a configuration in which the electric double layer capacitor is charged while controlling current using switching operations of a switching element.

CITATION LIST

Patent Documents

Patent Document 1: Japanese Patent No. 4862074
Patent Document 2: Japanese Patent No. 5618024

SUMMARY

Technical Problem

With the charging method of Patent Document 1 (a method that limits charging current using a resistance unit), the charging current decreases as the resistance value of the resistance unit increases, and thus it takes time to charge the power storage unit. Thus to increase the charging speed, it is necessary to keep the resistance value of the resistance unit relatively low. However, if the resistance value is low, a large charging current will flow when the voltage of the power storage unit (the charging target) is low, and heat generation during charging becomes a problem. On the other hand, with the charging method of Patent Document 2 (a method that controls charging current using the switching of a switching element), noise and the like produced by the switching operations are a problem.

Having been conceived on the basis of the above-described circumstances, an object of some aspects of preferred embodiments is to realize a power source device capable of charging a power storage unit using power from a power source unit, with a configuration capable of suppressing the generation of heat and noise.

Solution to Problem

A power source device according to a first embodiment includes:

a first charging circuit including a switch unit, the switch unit being provided in a first energizing path between a power source unit and a power storage unit and switching the first energizing path between an energized state and a non-energized state, and a resistance unit, a charging current based on power from the power source unit flowing in the resistance unit when the switch unit is in the energized state;

a second charging circuit, including a switching element provided in a second energizing path between the power source unit and the power storage unit, that through on-off operations of the switching element converts an input voltage applied to an input-side conduction path electrically connected to the power source unit, and outputs the input voltage to an output-side conduction path electrically connected to the power storage unit;

a detection unit that detects a value reflecting an output voltage of the power storage unit; and a control unit that determines an output state of the power storage unit on the basis of the detection value detected by the detection unit, and in the case where the output state of the power storage unit corresponds to a prescribed high-voltage state when prescribed charging conditions are satisfied, causes only the first charging circuit, among the first charging circuit and the second charging circuit, to operate, and in the case where the output state of the power storage unit does not correspond to the prescribed high-voltage state when the prescribed charging conditions are satisfied, causes at least the second charging circuit, among the first charging circuit and the second charging circuit, to operate.

A power source device according to a second embodiment includes:

a first charging circuit including a switch unit, the switch unit being provided in a first energizing path between a power source unit and a power storage unit and switching the first energizing path between an energized state and a non-energized state, and a resistance unit, a charging current based on power from the power source unit flowing in the resistance unit when the switch unit is in the energized state;

a second charging circuit, including a switching element provided in a second energizing path between the power source unit and the power storage unit, that through on-off operations of the switching element converts an input voltage applied to an input-side conduction path electrically connected to the power source unit, and outputs the input voltage to an output-side conduction path electrically connected to the power storage unit;

a detection unit that detects a value reflecting an output voltage of the power storage unit; and a control unit that determines an output state of the power storage unit on the basis of the detection value detected by the detection unit, and in the case where the output state of the power storage unit corresponds to a prescribed low-voltage state when prescribed charging conditions are satisfied, causes only the second charging circuit, among the first charging circuit and the second charging circuit, to operate, and in the case where the output state of the power storage unit does not correspond to the prescribed low-voltage state when the prescribed charging conditions are satisfied, causes at least the first charging circuit, among the first charging circuit and the second charging circuit, to operate.

Advantageous Effects

In the power source device of the first embodiment, the control unit determines the output state of the power storage unit on the basis of the detection value detected by the detection unit. If the output state of the power storage unit corresponds to the prescribed high-voltage state when the prescribed charging conditions are satisfied, only the first charging circuit, among the first charging circuit and the second charging circuit, is operated, whereas if the output state does not correspond to the prescribed high-voltage state, at least the second charging circuit, among the first charging circuit and the second charging circuit, is operated.

In other words, if the output state of the power storage unit is relatively high, charging current can be supplied to the power storage unit by operating the first charging circuit without operating the second charging circuit, and thus charging can be carried out while suppressing noise produced by switching operations. If the output state of the power storage unit is relatively high, the charging current flowing in the resistance unit can be kept lower than when the output of the power storage unit is low, and thus the amount of heat generated can be suppressed more than when the output of the power storage unit is low.

If the output state of the power storage unit does not correspond to the prescribed high-voltage state, charging current can be supplied to the power storage unit by operating at least the second charging circuit. In this manner, when in a state where the amount of heat generated will increase if the first charging circuit is operated, producing some or all of the charging current supplied to the power storage unit using the second charging circuit makes it possible to suppress heat generated by operations of the first charging circuit.

Accordingly, an object is to realize a power source device, capable of charging a power storage unit using power from a power source unit, with a configuration capable of suppressing the generation of heat and noise.

In the power source device of the second embodiment, the control unit determines the output state of the power storage unit on the basis of the detection value detected by the detection unit. If the output state of the power storage unit corresponds to the prescribed low-voltage state when the prescribed charging conditions are satisfied, only the first charging circuit, among the first charging circuit and the second charging circuit, is operated, whereas if the output state does not correspond to the prescribed low-voltage state, at least the second charging circuit, among the first charging circuit and the second charging circuit, is operated.

With this configuration, if the output state of the power storage unit is relatively low, charging current can be supplied to the power storage unit by operating the second charging circuit without operating the first charging circuit. In other words, in a state where there is a relatively large potential difference between the power source unit and the power storage unit, i.e., in a state where a large amount of current flows in the resistance unit when the first charging circuit is operated and an increased amount of heat is generated as a result, the amount of heat generated in the resistance unit can be suppressed by operating only the second charging circuit.

If the output state of the power storage unit does not correspond to the prescribed low-voltage state, charging current can be supplied to the power storage unit by operating at least the first charging circuit. As such, in a state where the output of the power storage unit is relatively high, i.e., in a state where the charging current flowing in the resistance unit becomes relatively low and the generation of heat is suppressed when the first charging circuit is being operated, some or all of the charging current supplied to the power storage unit is produced by the first charging circuit, and thus the operations of the second charging circuit can be stopped or reduced.

Accordingly, an object is to realize a power source device, capable of charging a power storage unit using power from a power source unit, with a configuration capable of suppressing the generation of heat and noise.

DESCRIPTION OF EMBODIMENTS

Figure 1:
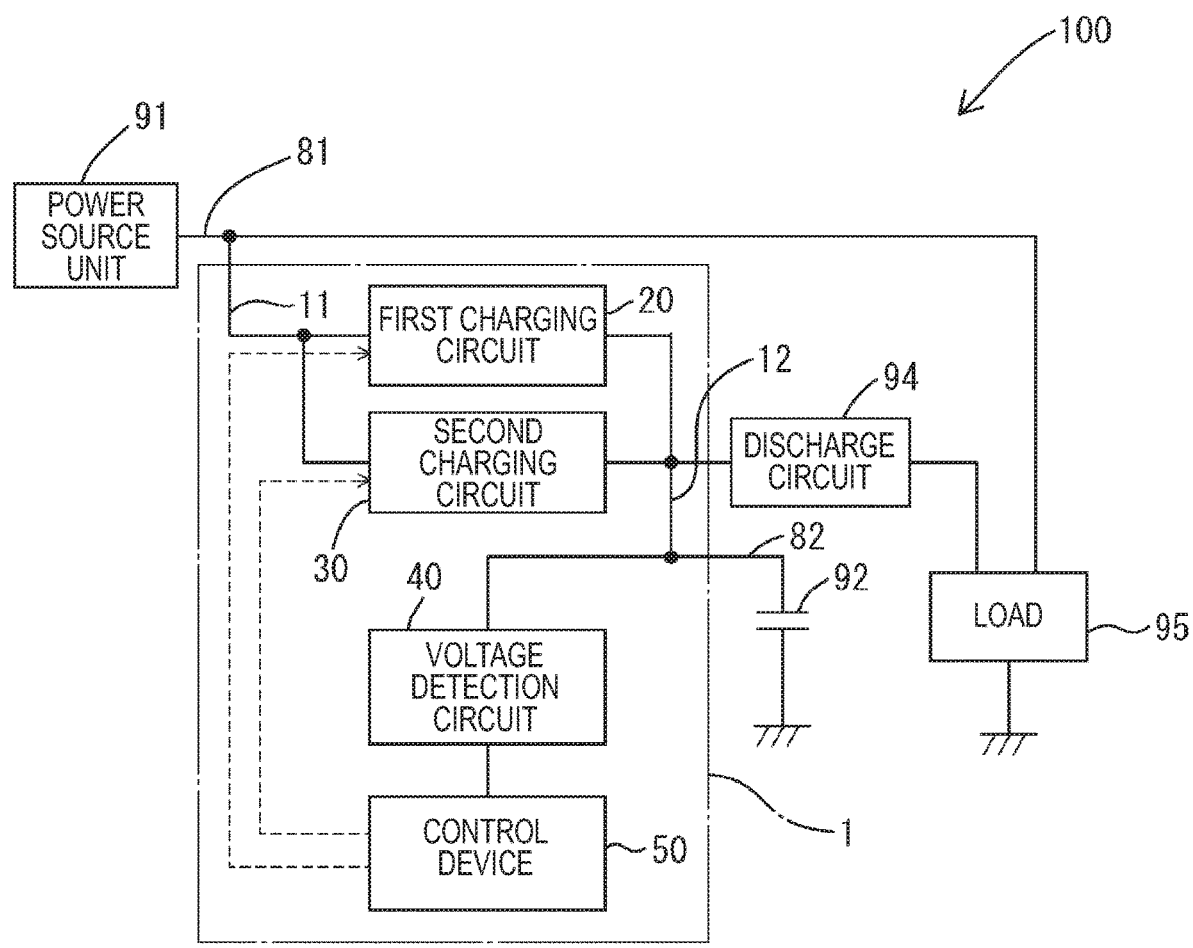
FIG. 1 is a block diagram illustrating an example of a vehicle-mounted power source system including a power source device according to a first embodiment.

Preferred examples of the preferred embodiments will be described here.

The control unit may determine the output state of the power storage unit on the basis of the detection value detected by the detection unit, and when the prescribed charging conditions are satisfied, may cause both the first charging circuit and the second charging circuit to operate in the case where the output state of the power storage unit corresponds to a prescribed intermediate voltage state, may cause only the first charging circuit, among the first charging circuit and the second charging circuit, to operate in the case where the output of the power storage unit is in a voltage state higher than the intermediate voltage state, and may cause only the second charging circuit, among the first charging circuit and the second charging circuit, to operate in the case where the output of the power storage unit is in a voltage state lower than the intermediate voltage state.

With this configuration, charging current can be supplied to the power storage unit by operating the second charging circuit without operating the first charging circuit when, among the intermediate voltage state, the voltage state higher than the intermediate voltage state, and the voltage state lower than the intermediate voltage state, the state is the voltage state lower than the intermediate voltage state, i.e., the state where the voltage of the power storage unit is the lowest out of the three states. In other words, in a state where a large amount of current flows in the resistance unit when the first charging circuit is operated, the amount of heat generated can be suppressed by operating the second charging circuit without operating the first charging circuit.

When in the intermediate voltage state, both the first charging circuit and the second charging circuit can be operated. Accordingly, more charging current can be supplied to the power storage unit, and thus the charge amount can be increased more quickly.

In the voltage state higher than the intermediate voltage state, i.e., the state where the voltage of the power storage unit is the highest out of the three states, charging current can be supplied to the power storage unit by operating the first charging circuit without operating the second charging circuit. As such, charging can be carried out while suppressing noise caused by operations of the second charging circuit. Moreover, the voltage of the power storage unit is in the highest state, and thus the current flowing in the resistance unit decreases, suppressing the generation of heat.

The control unit may determine whether or not the power storage unit has reached a prescribed fully-charged state on the basis of the detection value detected by the detection unit when at least one of the first charging circuit and the second charging circuit is operating, and in the case where it has been determined that the power storage unit has reached the prescribed fully-charged state, may stop the operations of the first charging circuit and the second charging circuit, may monitor the detection value detected by the detection unit while the operations of the first charging circuit and the second charging circuit are stopped, and may cause only the first charging circuit, among the first charging circuit and the second charging circuit, to operate in the case where the power storage unit has become a prescribed output decrease state during the monitoring.

If, after the power storage unit has reached the fully-charged state, the power storage unit is to be supplemented with charging current while near a fully-charged voltage state, supplying the charging current by operating the first charging circuit makes it possible to charge the power storage unit while suppressing switching noise. This is useful when charging at a relatively high voltage state, because the amount of heat generated when operating the first charging circuit can be suppressed.

The second charging circuit may include: a coil unit; a switching element, configured as a N-channel FET, a drain of the switching element being electrically connected to the input-side conduction path, a source of the switching element being electrically connected to one end of the coil unit, and the switching element turning on/off in response to a control signal supplied to a gate of the switching element; and a second switching element or a diode, one end of the second switching element or diode being electrically connected to a connection part between the source of the switching element and the coil unit, and another end of the second switching element or diode being electrically connected to a ground. Another end of the coil unit may be electrically connected to the power storage unit by the output-side conduction path. The control unit may cause only the first charging circuit, among the first charging circuit and the second charging circuit, to operate in the case where the output voltage of the power storage unit is greater than a prescribed threshold when the prescribed charging conditions are satisfied.

With this configuration, voltage conversion can be carried out by controlling the switching element (the N-channel FET), which constitutes a part of the second charging circuit, on and off, and charging current can be supplied to the power storage unit. However, when the second charging circuit has this configuration, if the output voltage of the power storage unit becomes high to a certain degree, appropriate means for reliably driving the switching element (the N-channel FET) (e.g., a charge pump circuit or the like) are necessary. As opposed to this, with the above-described configuration, the first charging circuit is operated without operating the second charging circuit in a situation where the output voltage of the power storage unit has become greater than the prescribed threshold and it has become likely that the switching element can no longer be driven. This makes it easier to simplify the configuration.

The power source device may include a power source unit-side detection unit that detects a value reflecting the output voltage of the power source unit. In the case where a difference between a voltage value indicated by a detection value from the power source unit-side detection unit and a voltage value indicated by the detection value from the detection unit is within a first range when the prescribed charging conditions are satisfied, the control unit may cause only the first charging circuit, among the first charging circuit and the second charging circuit, to operate, and in the case where the difference between the voltage value indicated by the detection value from the power source unit-side detection unit and the voltage value indicated by the detection value from the detection unit is within a second range, the second range being a range having a higher value than the first range, when the prescribed charging conditions are satisfied, the control unit may cause only the second charging circuit, among the first charging circuit and the second charging circuit, to operate.

As the difference between the power source unit-side voltage value and the power storage unit-side voltage value increases, the current flowing in the resistance unit when the first charging circuit is operated increases as well. Accordingly, switching that more appropriately takes the potential difference between the power source unit and the power storage unit into consideration can be carried out by operating only the first charging circuit when the difference between the power source unit-side voltage value and the power storage unit-side voltage value is relatively low and operating only the second charging circuit when the difference is relatively high, as in the above-described configuration. This effect is particularly marked when the voltage of the power source unit varies.

First Embodiment

A first embodiment will be described hereinafter.

A vehicle-mounted power source system 100 illustrated in FIG. 1 is configured as a power source system for vehicles, the system including: a power source unit 91 serving as a main power source; a power storage unit 92 serving as an auxiliary power source; a power source device 1 that controls charging of the power storage unit 92; a discharge circuit 94 that switches a discharge path from the power storage unit 92; and so on. This vehicle-mounted power source system 100 is a system that can charge the power storage unit 92 using the power source unit 91 in a prescribed period. The vehicle-mounted power source system 100 is also a system that can supply current to a load 95 using power from the power source unit 91 or the power storage unit 92. When, for example, the power source unit 91 is in a normal state (e.g., when an output voltage of the power source unit 91 is greater than or equal to a prescribed abnormal voltage), the load 95 can be operated using power from the power source unit 91. In a prescribed period (e.g., when the output voltage of the power source unit 91 has dropped below the prescribed abnormal voltage), a switch unit of the discharge circuit 94 is turned on, the power storage unit 92 is discharged, and the load 95 can be operated using the power from the power storage unit 92.

The power source unit 91 is constituted by known power storage means. In the example of FIG. 1, the power source unit 91 is configured as a lead battery. The power source unit 91 is configured to apply, to a power line unit 81, an output voltage based on a charge amount of the power source unit 91. A high potential-side terminal of the power source unit 91 is electrically connected to the power line unit 81, and a low potential-side terminal of the power source unit 91 is electrically connected to a ground. The output voltage of the power source unit 91 when fully charged is 12 V, for example, and the high potential-side terminal is kept at approximately 12 V when fully charged. Note that an alternator and the like, for example, are also connected to the power line unit 81 connected to the power source unit 91.

The power storage unit 92 is constituted by known power storage means. In the example of FIG. 1, the power storage unit 92 is configured as an electric double layer capacitor.

The power storage unit 92 is configured to apply, to a power line unit 82, an output voltage based on a charge amount of the power storage unit 92. A high potential-side terminal of the power storage unit 92 is electrically connected to the power line unit 82, and a low potential-side terminal of the power storage unit 92 is electrically connected to a ground.

The load 95 is a vehicle-mounted component that operates with power supplied from the power source unit 91. In the configuration illustrated in FIG. 1, power can be supplied to the load 95 from the power storage unit 92 when the discharge circuit 94 is switched to a discharge state. The load 95 can be any of a variety of electrical components for vehicles, such as an actuator for a motor or the like, a display device such as a light, an audio device, a navigation system, or the like. Although only one load 95 is illustrated in FIG. 1, the number of loads that can receive power supplied from the power source unit 91 and the power storage unit 92 is not limited.

As illustrated in FIG. 1, the power source device 1 includes a first charging circuit 20, a second charging circuit 30, a voltage detection circuit 40, and a control device 50.

Figure 2:
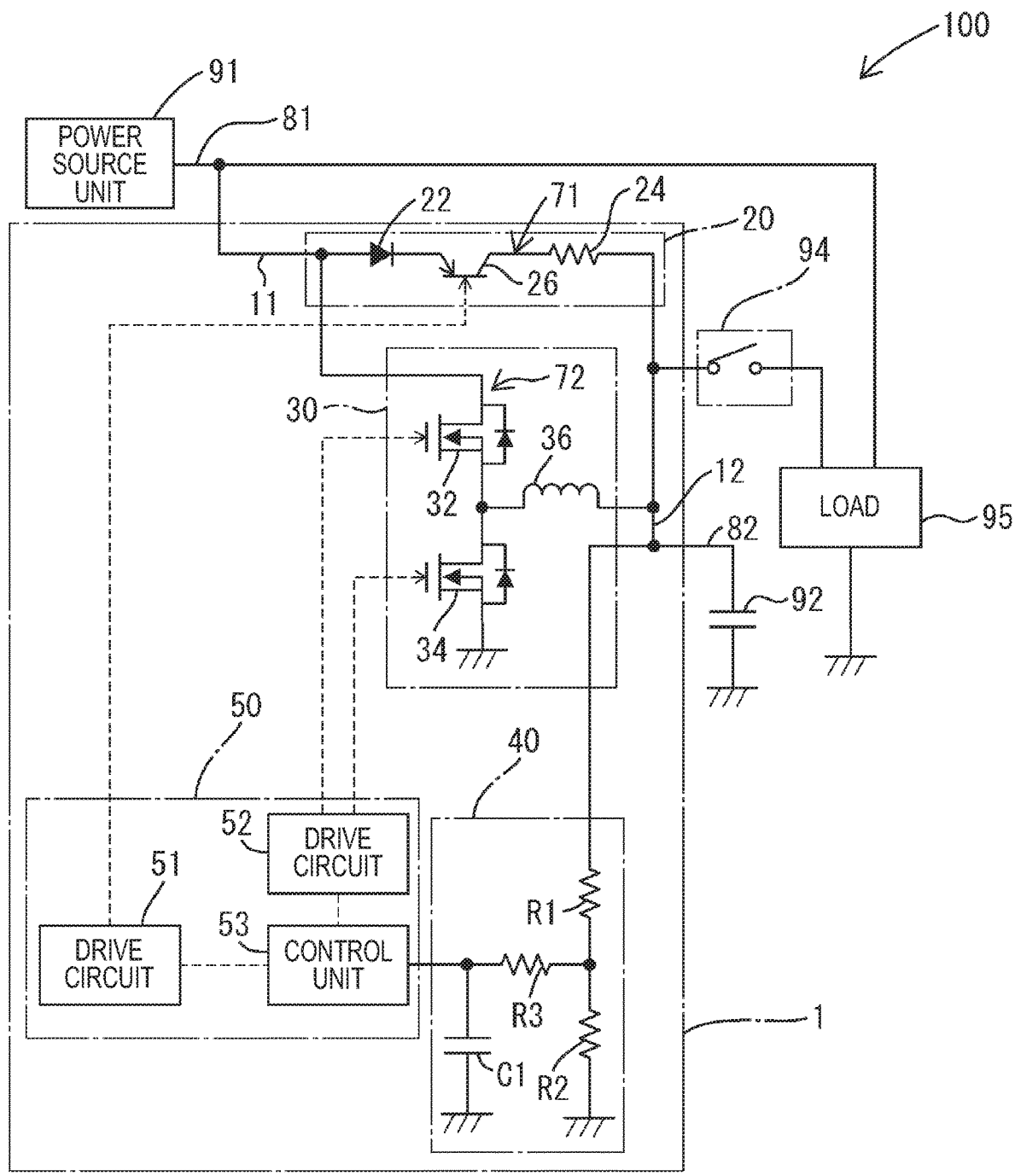
FIG. 2 is a circuit diagram illustrating a specific example of the vehicle-mounted power source system of FIG. 1.

The first charging circuit 20 is configured as a resistive charging circuit that carries out resistive charging. The first charging circuit 20 includes a diode 22, a resistance unit 24, and a switch unit 26. The first charging circuit 20 is a circuit that can supply charging current to a first conduction path 71 between the power source unit 91 and the power storage unit 92. In the example of FIG. 2, the first conduction path 71 is configured with the diode 22, the resistance unit 24, and the switch unit 26 connected in series.

The anode of the diode 22 is electrically connected to a first conduction path 11, while the cathode is electrically connected to the emitter of the switch unit 26. The diode 22 has a function of preventing current from flowing toward the power source unit 91 side from the power storage unit 92 side.

One end of the resistance unit 24 is electrically connected to the collector of the switch unit 26, while the other end is electrically connected to the high potential-side terminal of the power storage unit 92 via a second conduction path 12. The resistance unit 24 is configured so that when the switch unit 26 is on, i.e., when the switch unit 26 is in an energized state, charging current based on the power from the power source unit 91 flows.

The switch unit 26 is configured as a PNP bipolar transistor, with the emitter electrically connected to the cathode of the diode 22 and the collector electrically connected to the one end of the resistance unit 24. A drive circuit 51 is connected to the base of the switch unit 26, and the configuration is such that a drive signal from the drive circuit 51 is input to the base. The switch unit 26 has a function of switching the first energizing path 71 between an energized state and a non-energized state. Specifically, the switch unit 26 is on when an on signal is input to the base of the switch unit 26 from the drive circuit 51, and the first energizing path 71 is in the energized state while the switch unit 26 is on. The switch unit 26 is off when an off signal is input to the base of the switch unit 26 from the drive circuit 51, and the first energizing path 71 is in the non-energized state while the switch unit 26 is off. In other words, charging current flows in the first charging circuit 20 through the resistance unit 24 only while the on signal is being input to the base of the switch unit 26.

The second charging circuit 30 is configured as a switching-type charging circuit including a switching element 32 provided in a second energizing path 72 between the power source unit 91 and the power storage unit 92. The second charging circuit 30 is configured as a synchronous rectifying-type DC-DC converter. An input voltage applied to the first conduction path 11 electrically connected to the power source unit 91 is converted by on-off operations of the switching element 32, and is output to the second conduction path 12 electrically connected to the power storage unit 92.

The second charging circuit 30 may be a step-down DC-DC converter that steps down the input voltage applied to the first conduction path 11 and applies the stepped-down output voltage to the second conduction path 12, or may be a step-up DC-DC converter that steps up the input voltage applied to the first conduction path 11 and applies the stepped-up output voltage to the second conduction path 12. The following will describe an example in which the output voltage of the power storage unit 92 when fully charged is lower than the output voltage of the power source unit 91 when fully charged, and the second charging circuit 30 functions as a step-down DC-DC converter, as a representative example. In this example, switching elements 32 and 34 perform switching operations in response to PWM signals being complementarily output to the switching elements 32 and 34 from the control device 50. A DC voltage applied to the first conduction path 11, which is an input-side conduction path, is stepped down and output to the second conduction path 12, which is an output-side conduction path.

The second charging circuit 30 includes the switching elements 32 and 34, each of which is configured as an N-channel MOSFET, and a coil unit 36. The switching element 32, which is on a high side, is provided between the first conduction path 11 and the second conduction path 12, and the switching element 34, which is on a low side, is provided between the switching element 32 and a ground. The first conduction path 11 is electrically connected to the drain of the high-side switching element 32, and the drain of the low-side switching element 34 and one end of the coil unit 36 are electrically connected to the source. A first signal line from the control device 50 is connected to the gate of the switching element 32, and the on signal (a drive signal) or the off signal (a non-drive signal) is input to that gate from the control device 50. The switching element 32 turns on and off in response to a control signal (PWM signal) supplied to the gate from the exterior. The low-side switching element 34 is an example of a second switching element, the drain being electrically connected to a connection part connecting the switching element 32 and the coil unit 36, the source being electrically connected to a ground, and a second signal line from the control device 50 being connected to the gate. The on signal (drive signal) or the off signal (non-drive signal) from the control device 50 is input to the gate of the switching element 34. The switching element 34 turns on and off in response to a control signal (PWM signal) supplied to the gate from the exterior, and operates in synchronization with the switching element 32. The other end of the coil unit 36 is connected to the second conduction path 12, which is an output-side conduction path. In other words, the coil unit 36 is electrically connected to the power storage unit 92 through the second conduction path 12. Note that the switching element 34 need not be a synchronous rectifying type, and may be changed to a diode.

The voltage detection circuit 40 is an example of a detection unit, and has a function of detecting a value reflecting the output voltage of the power storage unit 92. In the example of FIG. 2, the voltage detection circuit 40 has a voltage division circuit constituted by a resistor R1 and a resistor R2 connected in series between the second conduction path 12 and a ground, and is configured to divide the voltage applied to the second conduction path 12. The voltage division circuit constituted by the resistor R1 and the resistor R2 inputs a divided voltage value obtained by dividing the voltage value of the second conduction path 12 into a control unit 53. A circuit constituted by a resistor R3 and a capacitor C1 is a filter circuit that removes input noise. The control unit 53 determines a voltage value of the second conduction path 12 from an input value (detection value) input from the voltage detection circuit 40. Although FIG. 2 illustrates one example of the voltage detection circuit 40, another known voltage detection circuit may be used as long as the configuration enables the voltage value of the second conduction path 12 to be detected.

A current detection circuit or the like (not shown) that detects inductor current flowing in the coil unit 36 is also provided in the second charging circuit 30. The control unit 53 can control output current by carrying out feedback control on the basis of the detection value from the current detection circuit.

The control device 50 includes the control unit 53, drive circuits 51 and 52, and so on. The control unit 53 is configured as a microcomputer, for example, and includes a computation device such as a CPU, memory devices such as ROM and RAM, and so on. The drive circuit 51 has a function of switching between an on signal and an off signal to a switch unit 56 in response to a signal from the control unit 53. The drive circuit 52 has a function of outputting a PWM signal based on a signal from the control unit 53, and is configured to complementarily deliver a PWM signal generated by the control unit 53, for example, to the respective gates of the switching elements 32 and 34.

Charging control carried out by the control unit 53 will be described next.

Figure 3:
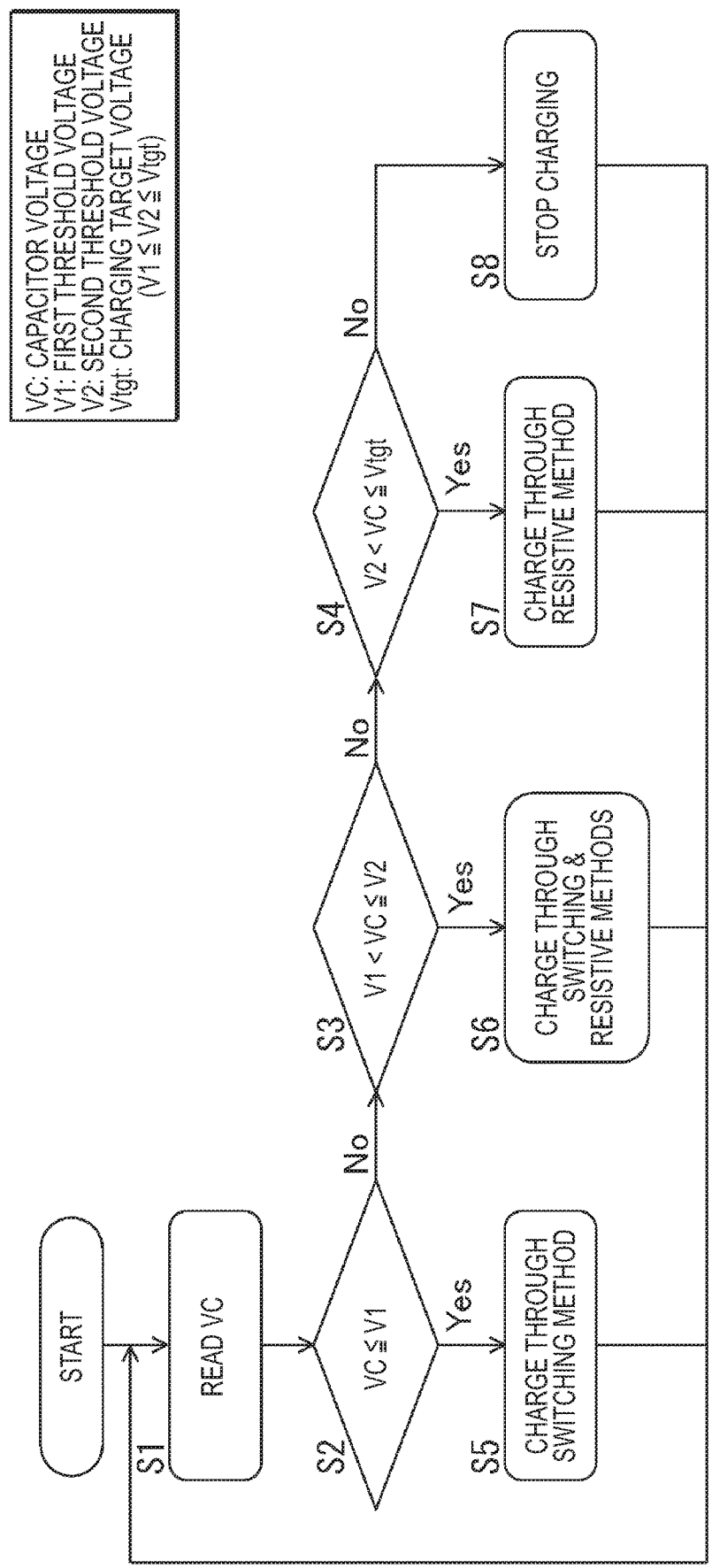
FIG. 3 is a flowchart illustrating an example of the flow of charging control carried out by the power source device of the first embodiment.

The control unit $2_{[t1]}$ starts the charging control illustrated in FIG. 3 when, for example, prescribed starting conditions are satisfied (e.g., when an ignition signal has switched from off to on). After starting the charging control of FIG. 3, first, the control unit 53 carries out the process of step S1, confirming a detection value (a value indicating the voltage of the second conduction path 12) input from the voltage detection circuit 40. After the process of step S1, the control unit 53 carries out the process of step S2, determining whether or not a voltage value VC of the second conduction path 12 (also called a capacitor voltage VC hereinafter) is less than or equal to a first threshold voltage V1. If in the process of step S2 it is determined that the voltage value VC of the second conduction path 12 is less than or equal to the first threshold voltage V1, the control unit 53 carries out the process of step S5, charging the power storage unit 92 by operating only the second charging circuit 30 among the first charging circuit 20 and the second charging circuit 30.

The operations of the second charging circuit 30 executed in step S5 are therefore charging operations using a switching method. Specifically, the control unit 53 carries out feedback control according to a known method. On the basis of the voltage value (output voltage value) of the second conduction path 12 specified by the voltage detection circuit 40 and a pre-set target voltage value, the control unit 53 carries out feedback processing for generating a new duty that brings the output voltage value closer to the target voltage value, with the feedback computation being carried out at short intervals of time using a known computation method such as a PID computation method. Each time the duty is updated through such feedback computation, the control unit 53 outputs a PWM signal at the newly-set duty to the drive circuit 52. The drive circuit 52 complementarily delivers the PWM signal generated by the control unit 53 to the respective gates of the switching elements 32 and 34, having set dead time for the delivery. As a result, the state is switched between a first state in which the switching element 32 is on and the switching element 34 is off, and a second state in which the switching element 32 is off and the switching element 34 is on, in an alternating manner. When this switching is repeated, the input voltage (DC voltage) applied to the first conduction path 11 is stepped down, and the stepped-down output voltage is applied to the second conduction path 12. The output voltage applied to the second conduction path 12 is set in accordance with the duty ratio of the PWM signal supplied to the gate of the switching element 32.

If charging operations according to this switching method (charging operations by the second charging circuit 30 only) are not underway at the point in time when step S5 is started, the control unit 53 starts the switching method charging operations in step S5, whereas if the charging operations are already underway at the point in time when step S5 is started, the control unit 53 continues the switching method charging operations. The control unit 53 continues the switching method charging operations until the process of one of steps S6, S7, and S8 is carried out. Note that after the control unit 53 has moved from step S2 to step S5 and started or continued the operations of the first charging circuit 20, the control unit 53 returns to step S1 and carries out the processing from step S1 on.

In this manner, the control unit 53 determines the output state of the power storage unit 92 on the basis of the detection value detected by the voltage detection circuit 40, and if the output state of the power storage unit 92 corresponds to a prescribed low-voltage state when prescribed charging conditions are satisfied, causes only the second charging circuit 30, among the first charging circuit 20 and the second charging circuit 30, to operate. In this example, a state in which the voltage (capacitor voltage) VC of the second conduction path 12 detected by the voltage detection circuit 40 is less than or equal to the first threshold voltage V1 is the "prescribed low-voltage state". A state in which the voltage value VC (capacitor voltage) of the second conduction path 12 is less than or equal to the first threshold voltage V1 also corresponds to a voltage state lower than a state where the output of the power storage unit 92 is an intermediate voltage, which will be described later. Additionally, in this configuration, when the voltage value VC (capacitor voltage) of the second conduction path 12 is less than or equal to a charging target voltage Vtgt, the "prescribed charging conditions are satisfied".

If it has been determined in the process of step S2 that the "voltage value VC of the second conduction path 12 is not less than or equal to the first threshold voltage V1", the control unit 53 carries out the process of step S3, determining whether or not the "voltage value VC (capacitor voltage) of the second conduction path 12 is greater than the first threshold voltage V1 and less than or equal to a second threshold voltage V2". If it has been determined in the process of step S3 that the "voltage value VC (capacitor voltage) of the second conduction path 12 is greater than the first threshold voltage V1 and less than or equal to the second threshold voltage V2", the control unit 53 carries out the process of step S6, charging the power storage unit 92 by causing both the first charging circuit 20 and the second charging circuit 30 to operate.

When causing the second charging circuit 30 to operate, the control unit 53 drives the second charging circuit 30 according to the same method as the above-described operating method carried out in step S5. Additionally, when causing the first charging circuit 20 to operate, the control unit 53 supplies a drive signal to the drive circuit 51, and the drive circuit 51 outputs an on signal to the switch unit 26 while the drive signal is being supplied. As such, the switch unit 26 remains continuously on, and charging current flows from the power source unit 91 to the power storage unit 92, while the control unit 53 continues instructing the first charging circuit 20 to operate and control for causing the first charging circuit 20 to operate is being carried out.

In this manner, the control unit 53 causes both the first charging circuit 20 and the second charging circuit 30 to operate if the output state of the power storage unit 93 corresponds to a prescribed intermediate voltage state when prescribed charging conditions are satisfied. In this example, a state in which the voltage value VC (capacitor voltage) of the second conduction path 12 detected by the voltage detection circuit 40 is greater than the first threshold voltage V1 and less than or equal to the second threshold voltage V2 is the "prescribed intermediate voltage state".

If it has been determined in the process of step S3 that the "voltage value VC of the second conduction path 12 is not greater than the first threshold voltage V1 and less than or equal to the second threshold voltage V2", the control unit 53 carries out the process of step S4, determining whether or not the "voltage value VC (capacitor voltage) of the second conduction path 12 is greater than the second threshold voltage V2 and less than or equal to the charging target voltage Vtgt". If in the process of step S4 it is determined that the "voltage value VC (capacitor voltage) of the second conduction path 12 is greater than the second threshold voltage V2 and less than or equal to the charging target voltage Vtgt", the control unit 53 carries out the process of step S7, charging the power storage unit 92 by operating only the first charging circuit 20 among the first charging circuit 20 and the second charging circuit 30.

In this manner, the control unit 53 determines the output state of the power storage unit 92 on the basis of the detection value detected by the voltage detection circuit 40, and if the output state of the power storage unit 92 corresponds to a prescribed high-voltage state when prescribed charging conditions are satisfied, causes only the first charging circuit 20, among the first charging circuit 20 and the second charging circuit 30, to operate. In this example, the state in which the voltage value VC (capacitor voltage) of the second conduction path 12 detected by the voltage detection circuit 40 is greater than the second threshold voltage V2 and less than or equal to the charging target voltage Vtgt is the "prescribed high-voltage state". A state in which the voltage value VC (capacitor voltage) of the second conduction path 12 is greater than the second threshold voltage V2 also corresponds to a voltage state higher than the state where the output of the power storage unit 92 is an intermediate voltage, which will be described later.

If it has been determined in the process of step S4 that the "voltage value VC of the second conduction path 12 is not greater than the second threshold voltage V2 and less than or equal to the charging target voltage Vtgt", the control unit 53 carries out the process of step S8, stopping both the first charging circuit 20 and the second charging circuit 30. The control unit 53 continuously monitors the voltage value VC (capacitor voltage) of the second conduction path 12 even after the first charging circuit 20 and the second charging circuit 30 have been stopped by the process of step S8, but because a determination of No is made in each of steps S2, S3, and S4 while the voltage value VC of the second conduction path 12 is greater than the charging target voltage Vtgt, the first charging circuit 20 and the second charging circuit 30 remain in a stopped state.

In this manner, the control unit 53 determines whether or not the power storage unit 92 has reached a prescribed fully-charged state on the basis of the detection value detected by the voltage detection circuit 40 while at least one of the first charging circuit 20 and the second charging circuit 30 is being operated. If it is determined that the power storage unit 92 has reached the prescribed fully-charged state, the operations of the first charging circuit 20 and the second charging circuit 30 are stopped. Note that the "state in which the voltage value VC of the second conduction path 12 detected by the voltage detection circuit 40 is greater than the charging target voltage Vtgt" corresponds to an example of the "state in which the power storage unit 92 has reached the prescribed fully-charged state".

After stopping the operations of the first charging circuit 20 and the second charging circuit 30 in step S8, the control unit 53 monitors the voltage value VC (capacitor voltage) of the second conduction path 12 detected by the voltage detection circuit 40 while the operations of the first charging circuit 20 and the second charging circuit 30 are stopped. If the voltage value VC of the second conduction path 12 has become less than or equal to the charging target voltage Vtgt, due to leak current or the like, during the monitoring, the control unit 53 makes a determination of Yes in step S4 (i.e., moves to step S7), as long as the voltage value VC of the second conduction path 12 does not become less than or equal to the second threshold voltage V2. In step S7, charging is carried out using the first charging circuit 20 (charging using a resistive method). In this manner, if the detection value detected by the voltage detection circuit 40 (the voltage value VC of the second conduction path 12) has become less than or equal to the charging target voltage Vtgt while the operations of the first charging circuit 20 and the second charging circuit 30 are stopped (i.e., if the power storage unit 92 has entered a prescribed output decrease state), the power storage unit 92 is charged by operating only the first charging circuit 20, among the first charging circuit 20 and the second charging circuit 30.

As described thus far, in the power source device 1, the control unit 53 determines the output state of the power storage unit 92 on the basis of the detection value detected by the voltage detection circuit 40. If the output state of the power storage unit 92 corresponds to the prescribed high-voltage state when prescribed charging conditions are satisfied, only the first charging circuit 20, among the first charging circuit 20 and the second charging circuit 30, is operated, whereas if the output state does not correspond to the prescribed high-voltage state, at least the second charging circuit 30, among the first charging circuit 20 and the second charging circuit 30, is operated.

In other words, if the output state of the power storage unit 92 is relatively high, charging current can be supplied to the power storage unit 92 by operating the first charging circuit 20 without operating the second charging circuit 30, and thus charging can be carried out while suppressing noise produced by switching operations. If the output state of the power storage unit 92 is relatively high, the charging current flowing in the resistance unit 24 can be kept lower than when the output of the power storage unit 92 is low, and thus the amount of heat generated can be suppressed more than when the output of the power storage unit 92 is low. If the output state of the power storage unit 92 does not correspond to the prescribed high-voltage state, charging current can be supplied to the power storage unit 92 by operating at least the second charging circuit 30. In this manner, when in a state where the amount of heat generated will increase if the first charging circuit 20 is operated, producing some or all of the charging current supplied to the power storage unit 92 using the second charging circuit 30 makes it possible to suppress heat generated by operations of the first charging circuit 20.

Furthermore, the control unit 53 determines the output state of the power storage unit 92 on the basis of the detection value detected by the voltage detection circuit 40. If the output state of the power storage unit 92 corresponds to the prescribed low-voltage state when prescribed charging conditions are satisfied, only the second charging circuit 30, among the first charging circuit 20 and the second charging circuit 30, is operated, whereas if the output state does not correspond to the prescribed low-voltage state, at least the first charging circuit 20, among the first charging circuit 20 and the second charging circuit 30, is operated.

With this configuration, if the output state of the power storage unit 92 is relatively low, charging current can be supplied to the power storage unit 92 by operating the second charging circuit 30 without operating the first charging circuit 20. In other words, in a state where there is a relatively large potential difference between the power source unit 91 and the power storage unit 92, i.e., in a state where a large amount of current flows in the resistance unit 24 when the first charging circuit 20 is operated and an increased amount of heat is generated as a result, the amount of heat generated in the resistance unit 24 can be suppressed by operating only the second charging circuit 30. If the output state of the power storage unit 92 does not correspond to the prescribed low-voltage state, charging current can be supplied to the power storage unit 92 by operating at least the first charging circuit 20. As such, in a state where the output of the power storage unit 92 is relatively high, i.e., in a state where the charging current flowing in the resistance unit 24 becomes relatively low and the generation of heat is suppressed when the first charging circuit 20 is being operated, some or all of the charging current supplied to the power storage unit 92 is produced by the first charging circuit 20, and thus the operations of the second charging circuit 30 can be stopped or reduced.

The control unit 53 determines the output state of the power storage unit 92 on the basis of the detection value detected by the voltage detection circuit 40, and if the output state of the power storage unit 92 corresponds to the prescribed intermediate voltage state when prescribed charging conditions are satisfied, causes both the first charging circuit 20 and the second charging circuit 30 to operate. If the output of the power storage unit 92 is in a voltage state that is higher than the intermediate voltage state, only the first charging circuit 20, among the first charging circuit 20 and the second charging circuit 30, is operated, whereas if the output of the power storage unit 92 is in a voltage state that is lower than the intermediate voltage state, only the second charging circuit 30, among the first charging circuit 20 and the second charging circuit 30, is operated.

With this configuration, charging current can be supplied to the power storage unit 92 by operating the second charging circuit 30 without operating the first charging circuit 20 when, among the intermediate voltage state, the voltage state higher than the intermediate voltage state, and the voltage state lower than the intermediate voltage state, the state is the voltage state lower than the intermediate voltage state, i.e., the state where the voltage of the power storage unit 92 is the lowest out of the three states. In other words, in a state where a large amount of current flows in the resistance unit 24 when the first charging circuit 20 is operated, the amount of heat generated can be suppressed by operating the second charging circuit 30 without operating the first charging circuit 20. When in the intermediate voltage state, both the first charging circuit 20 and the second charging circuit 30 can be operated. Accordingly, more charging current can be supplied to the power storage unit 92, and thus the charge amount can be increased more quickly. In the voltage state higher than the intermediate voltage state, i.e., the state where the voltage of the power storage unit 92 is the highest out of the three states, charging current can be supplied to the power storage unit 92 by operating the first charging circuit 20 without operating the second charging circuit 30. As such, charging can be carried out while suppressing noise caused by operations of the second charging circuit 30. Moreover, the voltage of the power storage unit 92 is in the highest state, and thus the current flowing in the resistance unit 24 decreases, suppressing the generation of heat.

The control unit 53 determines whether or not the power storage unit 92 has reached the prescribed fully-charged state on the basis of the detection value detected by the voltage detection circuit 40 while at least one of the first charging circuit 20 and the second charging circuit 30 is being operated. If it is determined that the power storage unit 92 has reached the prescribed fully-charged state, the operations of the first charging circuit 20 and the second charging circuit 30 are stopped. The detection value detected by the voltage detection circuit 40 is monitored while the operations of the first charging circuit 20 and the second charging circuit 30 are stopped, and if the power storage unit 92 has entered a prescribed output decrease state during the monitoring, only the first charging circuit 20, among the first charging circuit 20 and the second charging circuit 30, is operated.

If, after the power storage unit 92 has reached the fully-charged state, the power storage unit 92 is to be supplemented with charging current while near a fully-charged voltage state, supplying the charging current by operating the first charging circuit 20 makes it possible to charge the power storage unit 92 while suppressing switching noise. This is useful when charging at a relatively high voltage state, because the amount of heat generated when operating the first charging circuit 20 can be suppressed.

The second charging circuit 30 includes: the coil unit 36; the switching element 32, which is configured as an N-channel FET, the drain of which is electrically connected to the first conduction path 11 and the source of which is electrically connected to one end of the coil unit 36, and which turns on and off in response to a control signal supplied to the gate from the exterior; and the second switching element 34, one end of which is electrically connected to the connection part between the source of the switching element 32 and the coil unit and the other end of which is electrically connected to a ground. The other end of the coil unit 36 is electrically connected to the power storage unit 92 through the second conduction path 12. If the output voltage of the power storage unit 92 (the voltage value VC of the second conduction path 12) is greater than a prescribed threshold (the second threshold voltage V2) when prescribed charging conditions are satisfied, the control unit 53 causes only the first charging circuit 20, among the first charging circuit 20 and the second charging circuit 30, to operate.

With this configuration, voltage conversion can be carried out by controlling the switching element 32 (the N-channel FET), which constitutes a part of the second charging circuit 30, on and off, and charging current can be supplied to the power storage unit 92. However, when the second charging circuit 30 has this configuration, if the output voltage of the power storage unit 92 becomes high to a certain degree, appropriate means for reliably driving the switching element 32 (the N-channel FET) (e.g., a charge pump circuit or the like) are necessary. As opposed to this, with the power source device 1 configured in this manner, the first charging circuit 20 is operated without operating the second charging circuit 30 in a situation where the output voltage of the power storage unit 92 (the voltage value VC of the second conduction path 12) has become greater than the prescribed threshold (the second threshold voltage V2) and it has become likely that the switching element 32 can no longer be driven. A charge pump circuit or the like is therefore unnecessary, which makes it easier to simplify the configuration.

OTHER EMBODIMENTS

Figure 4:
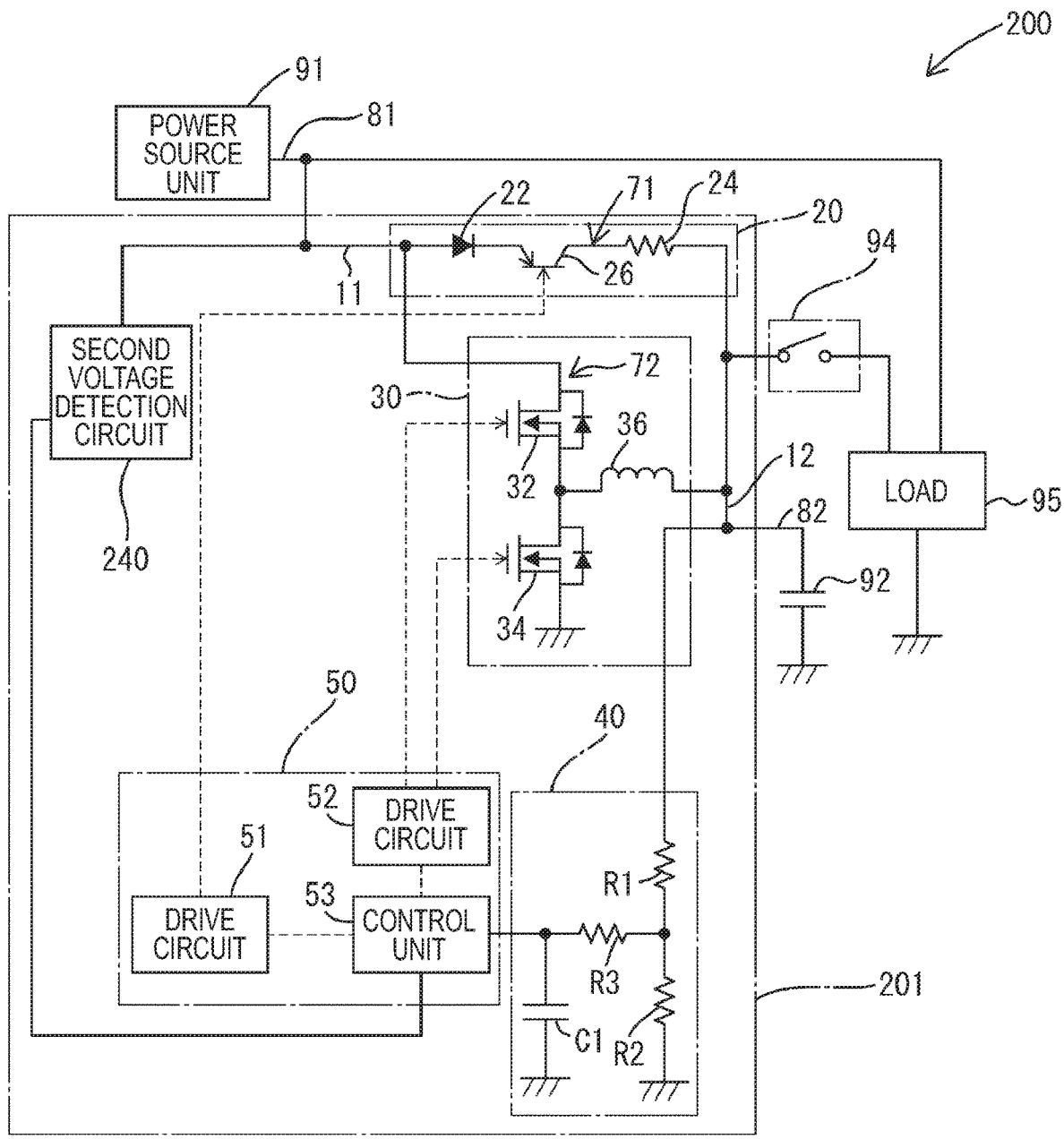
FIG. 4 is a circuit diagram illustrating an example of a vehicle-mounted power source system including a power source device according to another embodiment.

The present invention is not limited to the embodiment described above with reference to the drawings, and embodiments such as the following, for example, also fall within the technical scope of the present invention.
(1) The specific examples of the power source unit 91 and the power storage unit 92 in the above-described embodiment are merely examples. The types, generated voltages, and so on of the power source unit 91 and the power storage unit 92 are not limited to the above-described examples, and many changes can be made in any of the examples.
(2) Although the above-described embodiment gives an example of the load 95, the number of loads, the type of loads, and so on are not particularly limited in any of the examples.
(3) Although the above-described embodiment gives an example in which the switch unit 26 is configured as a PNP bipolar transistor, the switch unit 26 may be configured as a NPN bipolar transistor in any of the examples. The switch unit 26 is not limited to a bipolar transistor, and may be another switch means (a known semiconductor switch such as a MOSFET or the like).
(4) Although the above-described embodiment gives an example of the first charging circuit, any configuration capable of supplying charging current to a resistance unit by keeping a switch unit continuously on and capable of stopping the supply of the charging current by keeping the switch unit continuously off may be employed, in any of the examples. A variety of known charging circuits corresponding to this method can be employed as the first charging circuit.
(5) Although the above-described embodiment gives an example of the second charging circuit, the second charging circuit may, in any of the examples, be any charging circuit that generates a desired voltage or current through voltage conversion carried out by on/off operations of a switching element. A variety of known charging circuits corresponding to this method can be employed as the second charging circuit.
(6) Although the above-described embodiment gives an example of a configuration in which the output state of the power storage unit 92 is determined on the basis of the output voltage of the power storage unit 92 (and specifically, the voltage detected by the voltage detection circuit 40), the configuration is not limited to this example. For example, in any of the examples, the vehicle-mounted power source system 100 illustrated in FIG. 2 may be changed as indicated by a vehicle-mounted power source system 200 illustrated in FIG. 4. In the vehicle-mounted power source system 200 illustrated in FIG. 4, the circuit configuration of a power source device 201 differs from the circuit configuration of the power source device 1 illustrated in FIG. 2 in that a second voltage detection circuit 240 is provided. The second voltage detection circuit 240 corresponds to an example of a power source unit-side voltage detection unit, has a function of detecting a value reflecting the output voltage of the power source unit 91 (specifically, the output voltage value of the power source unit 91), and has a circuit configuration similar to that of the voltage detection circuit 40. Specifically, the second voltage detection circuit 240 is electrically connected to the first conduction path 11, and is configured to input a detection value indicating a voltage value of the first conduction path 11 to the control unit 53. In the example of FIG. 4, too, the control unit 53 carries out charging control similar to that illustrated in FIG. 3. However, in the example of FIG. 4, the control unit 53 detects, in step S1 of FIG. 3, a difference between the voltage value indicated by the detection value from the second voltage detection circuit 240 and the voltage value indicated by the detection value of the voltage detection circuit 40, and determines the output state of the power storage unit 92 on the basis of this difference. Then, in step S2, it is determined whether or not the difference between the voltage value indicated by the second voltage detection circuit 240 and the voltage value indicated by the voltage detection circuit 40 (i.e., an output voltage difference between the power source unit 91 and the power storage unit 92) is "greater than or equal to a first threshold". If the difference is greater than or equal to the first threshold (i.e., if the output voltage of the power storage unit 92 is relatively low), the process of S5 is carried out in the same manner as in the first embodiment. In step S3, it is determined whether or not the difference between the voltage value indicated by the second voltage detection circuit 240 and the voltage value indicated by the voltage detection circuit 40 is "less than the first threshold and greater than or equal to a second threshold". If the difference is "less than the first threshold and greater than or equal to the second threshold" (i.e., if the output voltage of the power storage unit 92 is at an intermediate level), the process of S6 is carried out in the same manner as in the first embodiment. In step S4, it is determined whether or not the difference between the voltage value indicated by the second voltage detection circuit 240 and the voltage value indicated by the voltage detection circuit 40 is "less than the second threshold and greater than or equal to a third threshold". If the difference is "less than the second threshold and greater than or equal to the third threshold" (i.e., if the output voltage of the power storage unit 92 is relatively high), the process of S7 is carried out in the same manner as in the first embodiment. The process of S8 is repeatedly executed while the difference between the voltage value indicated by the second voltage detection circuit 240 and the voltage value indicated by the voltage detection circuit 40 is less than the third threshold. During this period, both the first charging circuit 20 and the second charging circuit 30 are stopped, and charging is stopped. Note that the first threshold is higher than the second threshold and the second threshold is higher than the third threshold.

In this example, the difference between the voltage value indicated by the second voltage detection circuit 240 and the voltage value indicated by the voltage detection circuit 40 being greater than or equal to the third threshold corresponds to "prescribed charging conditions being satisfied". If the difference between the voltage value indicated by the second voltage detection circuit 240 and the voltage value indicated by the detection value from the voltage detection circuit 40 when the prescribed charging conditions are satisfied is within a first range (i.e., is greater than or equal to the second threshold and less than the third threshold), only the first charging circuit 20, among the first charging circuit 20 and the second charging circuit 30, is operated. Note that in this example, the difference between the voltage value indicated by the second voltage detection circuit 240 and the voltage value indicated by the detection value from the voltage detection circuit 40 being within the first range corresponds to the prescribed high-voltage state. Additionally, if the difference between the voltage value indicated by the detection value from the second voltage detection circuit 240 and the voltage value indicated by the detection value from the voltage detection circuit 40 when the prescribed charging conditions are satisfied is within a second range that is a range having a higher value than the first range (i.e., if the difference is greater than or equal to the first threshold), only the second charging circuit 30, among the first charging circuit 20 and the second charging circuit 30, is operated. Note that in this example, the difference between the voltage value indicated by the second voltage detection circuit 240 and the voltage value indicated by the detection value from the voltage detection circuit 40 being within the second range corresponds to the prescribed low-voltage state.

As the difference between the power source unit 91-side voltage value and the power storage unit 92-side voltage value increases, the current flowing in the resistance unit 24 when the first charging circuit 20 is operated increases as well. Accordingly, switching that more appropriately takes the potential difference between the power source unit 91 and the power storage unit 92 into consideration can be carried out by operating only the first charging circuit 20 when the difference between the power source unit 91-side voltage value and the power storage unit 92-side voltage value is relatively low and operating only the second charging circuit 30 when the difference is relatively high, as in the above-described configuration. This effect is particularly marked when the voltage of the power source unit 91 varies.

(7) Although the first embodiment describes the voltage of the second conduction path 12 (capacitor voltage) VC being less than or equal to a charging target voltage as "prescribed charging conditions being satisfied", the configuration is not limited to this example. For example, a situation that does not correspond to a state where the voltage of the second conduction path 12 (capacitor voltage) VC is less than or equal to the charging target voltage and a prescribed abnormal state is in effect (e.g., a state where the temperature of the power source device 1 is greater than or equal to a prescribed temperature, a state where a ground fault has been detected, or the like) may correspond to "prescribed charging conditions being satisfied". Alternatively, "prescribed charging conditions" may be set in advance as conditions aside from the above-described conditions.

REFERENCE SIGNS LIST 1, 201 . . . power source device
11 . . . first conduction path (input-side conduction path)
12 . . . second conduction path (output-side conduction path)
20 . . . first charging circuit
24 . . . resistance unit
26 . . . switch unit
30 . . . second charging circuit
32 . . . switching element
34 . . . switching element (second switching element)
36 . . . coil unit
40 . . . voltage detection circuit (detection unit)
71 . . . first energizing path
72 . . . second energizing path
91 . . . power source unit
92 . . . power storage unit
240 . . . second voltage detection circuit (power source unit-side detection unit)

The invention claimed is:

1. A power source device comprising:
a first charging circuit including a first switching element, the first switching element being provided in a first energizing path between a power source and a power storage device and switching the first energizing path between an energized state and a non-energized state, and a resistor, a charging current based on power from the power source flowing in the resistor when the first switching element is in the energized state;
a second charging circuit, including a second switching element provided in a second energizing path between the power source and the power storage device, that through on-off operations of the second switching element converts an input voltage applied to an input-side conduction path electrically connected to the power source into an output voltage having a different value from the input voltage, and outputs the output voltage to an output-side conduction path electrically connected to the power storage device;
a detection circuit that detects a value reflecting an output voltage of the power storage device; and
a controller that determines an output state of the power storage device on the basis of the detection value detected by the detection circuit, and in the case where the output state of the power storage device corresponds to a prescribed high-voltage state when prescribed charging conditions are satisfied, causes only the first charging circuit, among the first charging circuit and the second charging circuit, to operate, and in the case where the output state of the power storage device does not correspond to the prescribed high-voltage state when the prescribed charging conditions are satisfied, causes at least the second charging circuit, among the first charging circuit and the second charging circuit, to operate.

2. The power source device according to claim 1, wherein the controller determines the output state of the power storage device on the basis of the detection value detected by the detection circuit, and when the prescribed charging conditions are satisfied, causes both the first charging circuit and the second charging circuit to operate in the case where the output state of the power storage device corresponds to a prescribed intermediate voltage state, causes only the first charging circuit, among the first charging circuit and the second charging circuit, to operate in the case where the output of the power storage device is in a voltage state higher than the intermediate voltage state, and causes only the second charging circuit, among the first charging circuit and the second charging circuit, to operate in the case where the output of the power storage device is in a voltage state lower than the intermediate voltage state.

3. The power source device according to claim 2, wherein the controller determines whether or not the power storage device has reached a prescribed fully-charged state on the basis of the detection value detected by the detection circuit when at least one of the first charging circuit and the second charging circuit is operating, and in the case where it has been determined that the power storage device has reached the prescribed fully-charged state, stops the operations of the first charging circuit and the second charging circuit, monitors the detection value detected by the detection circuit while the operations of the first charging circuit and the second charging circuit are stopped, and causes only the first charging circuit, among the first charging circuit and the second charging circuit, to operate in the case where the power storage device has become a prescribed output decrease state during the monitoring.

4. The power source device according to claim 3, wherein the second charging circuit includes:
   a coil;
   the second switching element, configured as a N-channel FET, a drain of the second switching element being electrically connected to the input-side conduction path, a source of the second switching element being electrically connected to one end of the coil, and the second switching element turning on/off in response to a control signal supplied to a gate of the second switching element; and
   a third switching element or a diode, one end of the third switching element or diode being electrically connected to a connection part between the source of the second switching element and the coil, and another end of the third switching element or diode being electrically connected to a ground, and
   wherein another end of the coil is electrically connected to the power storage device by the output-side conduction path; and
   the controller causes only the first charging circuit, among the first charging circuit and the second charging circuit, to operate in the case where the output voltage of the power storage device is greater than a prescribed threshold when the prescribed charging conditions are satisfied.

5. The power source device according to claim 4, further comprising:
   a power source-side detection circuit that detects a value reflecting the output voltage of the power source,
   wherein in the case where a difference between a voltage value indicated by a detection value from the power source-side detection circuit and a voltage value indicated by the detection value from the detection circuit is within a first range when the prescribed charging conditions are satisfied, the controller causes only the first charging circuit, among the first charging circuit and the second charging circuit, to operate, and in the case where the difference between the voltage value indicated by the detection value from the power source-side detection circuit and the voltage value indicated by the detection value from the detection circuit is within a second range, the second range being a range having a higher value than the first range, when the prescribed charging conditions are satisfied, the controller causes only the second charging circuit, among the first charging circuit and the second charging circuit, to operate.

6. A power source device comprising:
   a first charging circuit including a first switching element, the first switching element being provided in a first energizing path between a power source and a power storage device and switching the first energizing path between an energized state and a non-energized state, and a resistor, a charging current based on power from the power source flowing in the resistor when the first switching element is in the energized state;
   a second charging circuit, including a second switching element provided in a second energizing path between the power source and the power storage device, that through on-off operations of the second switching element converts an input voltage applied to an input-side conduction path electrically connected to the power source into an output voltage having a different value front the input voltage, and outputs the output voltage to an output-side conduction path electrically connected to the power storage device;
   a detection circuit that detects a value reflecting an output voltage of the power storage device; and
   a controller that determines an output state of the power storage device on the basis of the detection value detected by the detection circuit, and in the case where the output state of the power storage device corresponds to a prescribed low-voltage state when prescribed charging conditions are satisfied, causes only the second charging circuit, among the first charging circuit and the second charging circuit, to operate, and in the case where the output state of the power storage device does not correspond to the prescribed low-voltage state when the prescribed charging conditions are satisfied, causes at least the first charging circuit, among the first charging circuit and the second charging circuit, to operate.

* * * * *